(12) United States Patent
Gueit

(10) Patent No.: US 8,303,295 B2
(45) Date of Patent: *Nov. 6, 2012

(54) EXPANSION TOOL DEVICE FOR PLIERS OR MACHINE FOR PRODUCING SOCKETS AT THE ENDS OF PIPES MADE OUT OF PLASTIC OR COMPOSITE MATERIAL

(75) Inventor: Aurélien Gueit, Reims (FR)

(73) Assignee: Virax, Societe par Actions Simplifiee, Epernay (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/041,027

(22) Filed: Mar. 4, 2011

(65) Prior Publication Data

US 2011/0151045 A1    Jun. 23, 2011

Related U.S. Application Data

(63) Continuation of application No. 11/965,683, filed on Dec. 27, 2007, now Pat. No. 7,922,475.

(30) Foreign Application Priority Data

Dec. 28, 2006   (FR) ...................................... 06 56030

(51) Int. Cl.
   *B29C 57/04*   (2006.01)
(52) U.S. Cl. .............. 425/393; 425/467; 425/DIG. 218; 72/393
(58) Field of Classification Search .......... 425/392–393, 425/466–467, DIG. 218; 72/392–393
   See application file for complete search history.

(56) References Cited

U.S. PATENT DOCUMENTS

| | | | |
|---|---|---|---|
| 4,107,249 | A | 8/1978 | Murai et al. |
| 7,128,560 | B2 | 10/2006 | Tandart |
| 2008/0160130 | A1 | 7/2008 | Gueit |

FOREIGN PATENT DOCUMENTS

| | | |
|---|---|---|
| EP | 0 252 868 | 1/1988 |
| EP | 0 417 674 | 3/1991 |
| EP | 0 718 057 | 6/1996 |
| EP | 0 682 758 | 8/1998 |
| EP | 0 878 287 | 11/1998 |
| EP | 1 118 401 | 7/2001 |
| GB | 1 485 098 | 9/1977 |
| GB | 1 524 149 | 9/1978 |
| JP | 57-009541 | 1/1982 |
| WO | WO 95/10000 | 4/1995 |
| WO | WO 98/06519 | 2/1998 |
| WO | WO 2009/000966 | 12/2008 |

*Primary Examiner* — Robert B Davis
*Assistant Examiner* — Thukhanh Nguyen
(74) *Attorney, Agent, or Firm* — Egbert Law Offices, PLLC

(57) ABSTRACT

The present invention is an expansion tool device for pliers or machine for producing sockets at the ends of pipes made out of plastic or composite material, used in the field of plumbing. The device includes a cylindrically-shaped ferrule formed by the tightening of several sector-shaped chucks. The chucks are movable in the radial direction under the action of the insertion between them of a tapered needle movable in axial translation through the actuation of the pliers or machine. The chucks are allowed to pass from a tightened position to a separated position. In an integrated way or in a unit designed capable of being intercalated between the ferrule and the pliers or machine, there is an automatic driver for the ferrule, when the ferrule passes from the separated position to the tightened position, directly or indirectly, in axial swiveling according to a portion of a turn.

16 Claims, 3 Drawing Sheets

EXPANSION TOOL DEVICE FOR PLIERS OR MACHINE FOR PRODUCING SOCKETS AT THE ENDS OF PIPES MADE OUT OF PLASTIC OR COMPOSITE MATERIAL

CROSS REFERENCE

This application is a continuation of U.S. application Ser. No. 11/965,683, titled "EXPANSION TOOL DEVICE FOR PLIERS OR MACHINE FOR PRODUCING SOCKETS AT THE ENDS OF PIPES MADE OUT OF PLASTIC OR COMPOSITE MATERIAL," filed Dec. 27, 2007. This application also claims priority to French Application No. 0656030, filed Dec. 28, 2006. U.S. application Ser. No. 11/965,683 was issued as U.S. Pat. No. 7,922,475 on Apr. 12, 2011. The entire contents of both of these applications are hereby incorporated by reference herein.

BACKGROUND OF THE INVENTION

1. Field of the Invention

The present invention relates to an expansion tool device for pliers or a machine for producing sockets at the ends of pipes made out of plastic material or out of composite materials of the type commonly referred to as multi-layer material, used in the field of plumbing.

2. Description of Related Art

In a known way, a socket, whether on a copper pipe or a pipe made out of plastic or composite material, is produced by means of manual pliers or a machine for producing sockets provided with an expansion tool that includes a cylindrically shaped ferrule formed by the tightening of several sector-shaped chucks movable in the radial direction. The nearing to each other of the legs of the pliers, or the actuation of the machine causes the axial displacement of a tapered needle between said chucks, causing the latter to move apart.

A socket on a plastic pipe or composite pipe is not produced entirely like a socket on an annealed copper tube. Indeed, the end of the pipe should be sufficiently widened in order to allow the fitment before it recovers its shape. Furthermore, for obvious reasons of strength, the thickness of the wall of the pipe increases as the diameter of the latter increases, and the more the thickness increases, the quicker the elastic recovering occurs, which requires a larger widening.

Now, during the expansion, the chucks separate from each other, which creates between them grooves into which the material penetrates so as to create internal turgidities. This deformation results into an imperfect fitment likely to cause leaks.

In order to cope with this disadvantage, although it is not possible to completely eliminate the formation of turgidities, there has been proposed, namely in European Patent No. EP0718057 and European Patent No. EP0878287, to machine the edges of the chucks so as to limit the deformations. Thus, in the first document, the edges are broken by forming a chamfer or a rounding-off, while in the second document the working surface of each chuck has at the level of each of its longitudinal edges a flat surface at right angles with respect to the side of said chuck, adjacent to said working surface.

However, in practice, in order to cope with this disadvantage, users proceed to a series of widening operations, each together with an axial swiveling of the tool with respect to the pipe, so that, at each expansion, the turgidities created during the preceding expansion are flattened. Though this does not allow eliminating completely the turgidities, it reduces their effects.

Though this way of operating allows using the traditional tools, it can prove delicate and difficult to be performed at some locations of limited access. In addition, it requires some attention from the user, who may not forget to rotate the tool, but must also take care that, upon rotation of the tool, the chucks are properly arranged in front of the previously created turgidities. This way of operating is thus at random and therefore likely to maintain the risk of leaks.

It should be noted that there is also known, from Japanese Patent No. 57 009541, an expansion tool having a tapered needle of which is provided with helical grooves, which catches the chucks included on their inner faces, being cooperative with the grooves, so that the axial displacement of said needle causes not only the radial separation of said chucks, but also their axial rotation. The widening is thus achieved through two conjugated movements of separation and rotation, which requires, on the one hand, special means for maintaining the tube, in order to prevent it from rotating, and powerful driving means, in this case hydraulic means, for transmitting, during the radial displacement of the tapered needle, a rotational motion to the chucks. The radial displacement is thus always associated with an axial rotation, either during the separation from or the nearing to each other of the chucks. Furthermore, such a tool requires the needle of the tool as well as the chucks to be of a particular design, whereas one of the objects of the invention is to allow using chucks of a traditional design.

SUMMARY OF EMBODIMENTS OF THE INVENTION

The object of the present invention is to provide an expansion tool device permitting to cope with the various above-mentioned disadvantages, in particular in that it allows achieving, independently from the shape of the chucks, a widening of the end of a tube almost without turgidities, so as not to cause any risks of leaks, while permitting time saving.

The expansion tool device for pliers or machine for producing sockets at the ends of pipes made out of plastic or composite material used in the field of plumbing according to the invention is of the type including a cylindrically-shaped ferrule formed by the tightening of several sector-shaped chucks movable in the radial direction under the action of the insertion between them of a tapered needle movable in axial translation by actuating said pliers or machine. The chucks are allowed to pass from a tightened position to a separated position, and it comprises, in an integrated way or in a unit designed capable of being intercalated between said ferrule and said pliers or machine, means designed capable, during the phase in which said ferrule passes from the separated position to the tightened position, of automatically driving said ferrule, directly or indirectly, in axial swiveling according to a portion of a turn.

After the expansion phase, during the return into the tightened position, the ferrule automatically swivels axially, in order to adopt a different angular position, so that the user can perform a second expansion without having to find an adequate position of the ferrule.

According to an additional feature of the expansion tool device according to the invention, the means designed capable of automatically driving the ferrule in swiveling consist of means for transforming a translational motion into a rotational motion.

According to another additional feature of the expansion tool device according to the invention, the means for transforming a translational motion into a rotational motion consist of a cam system directly or indirectly intercalated between the tapered needle and the ferrule.

According to another additional feature of the expansion tool device according to the invention, the means designed capable of automatically driving the ferrule in swiveling are designed capable of rotating said ferrule according to an angle of a value different from that of the angle according to which moves each sector the chucks are comprised of.

According to a preferred embodiment of the expansion tool device according to the invention, when it comprises six chucks, the means designed capable of automatically driving the ferrule in swiveling are designed capable of rotating said ferrule according to an angle of 40.degree.

According to a particular embodiment of the expansion tool device according to the invention, the ferrule is integral in rotation with a crown movable in rotation, which carries at least one catch with a radial axis inserted in the cam path of a cylindrical cam connected to the tapered needle and moving with the latter.

According to an additional feature of the particular embodiment of the expansion tool device according to the invention, the cylindrical cam is peripherally provided with a cam path defined by a series of alternating longitudinal grooves and diagonal grooves, wherein on the side of the chucks each of said diagonal grooves ends in a longitudinal groove at one and the same level. While on the other side, each of said longitudinal grooves ends into a diagonal groove which is deeper at that location, thus creating a diagonal shoulder. The catch followers have an extensible length so as to remain into contact with said bottom of the cam path.

The expansion tool device according to the invention also allows avoiding the use of chucks having a particular profile, such as those previously evoked and described in the prior art EP0718057 and EP0878287, so that it is possible to use traditional chucks.

It should be noted that the expansion tool according to the invention can be in various forms. Thus, it can be in the form of a unit comprised of several parts that can be made integral with each other, such as a part incorporating the chucks and a part incorporating the means for transforming a translational motion into a rotational motion.

The part incorporating the means for transforming a translational motion into a rotational motion can thus be designed capable of receiving an expansion tool of the traditional type, said part then consisting of an intermediate element constituting the interface between said tool and the pliers or the machine.

It should be noted that this part incorporating the means for transforming a translational motion into a rotational motion can also be part of the pliers or the machine.

The advantages and features of the expansion tool device according to the invention will more clearly result from the following description, with reference to the attached drawing, which represents a non-restrictive embodiment of same.

BRIEF DESCRIPTION OF THE DRAWINGS

For a better understanding of embodiments of the present invention as well as other objects and further features thereof, reference is made to the following description which is to be used in conjunction with the accompanying drawings, where.

DETAILED DESCRIPTION OF EXEMPLARY EMBODIMENTS OF THE INVENTION

Figure 1:
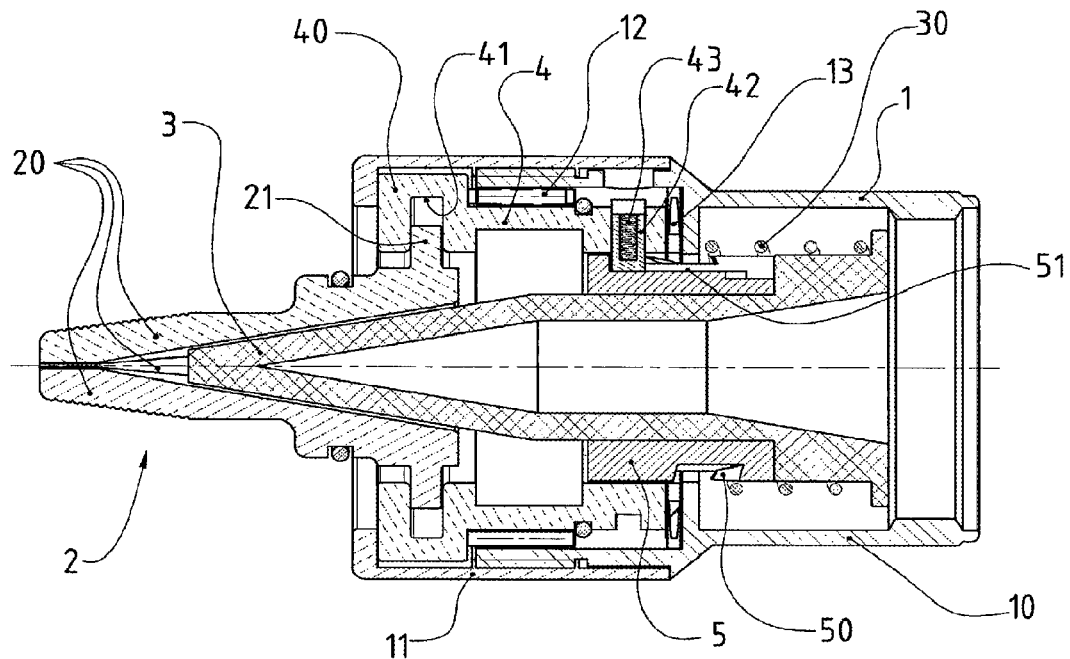
FIG. 1 shows a schematic cross-sectional view according to a median longitudinal plane of an expansion tool device according to the invention.
Figure 2:
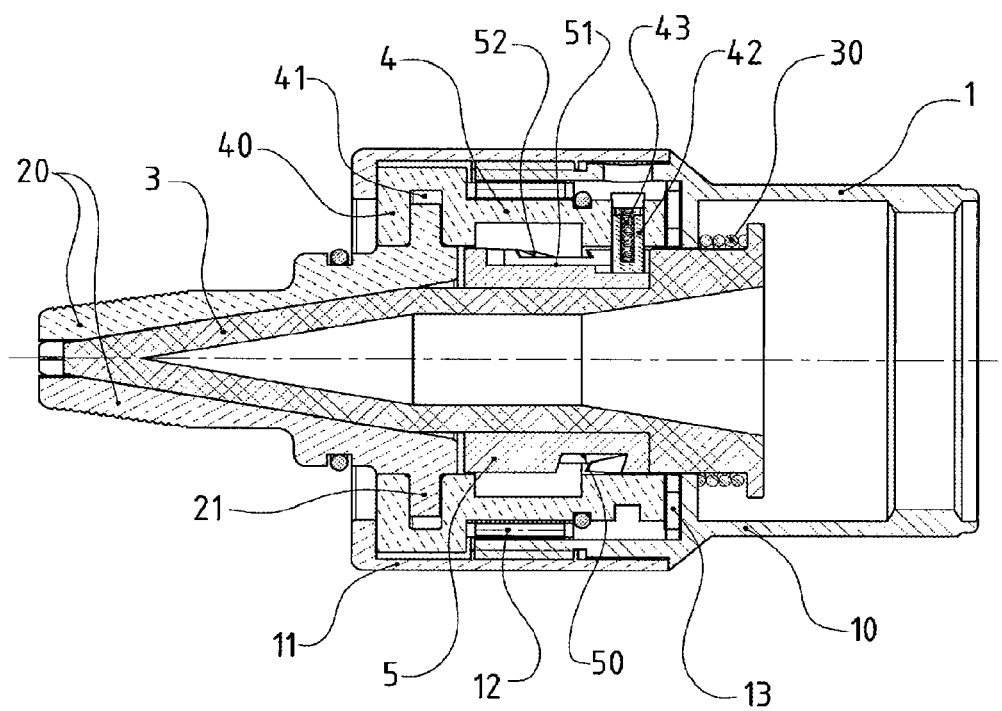
FIG. 2 shows a schematic cross-sectional view according to a median longitudinal plane of the same expansion tool device, in a different configuration of use.
Figure 3:
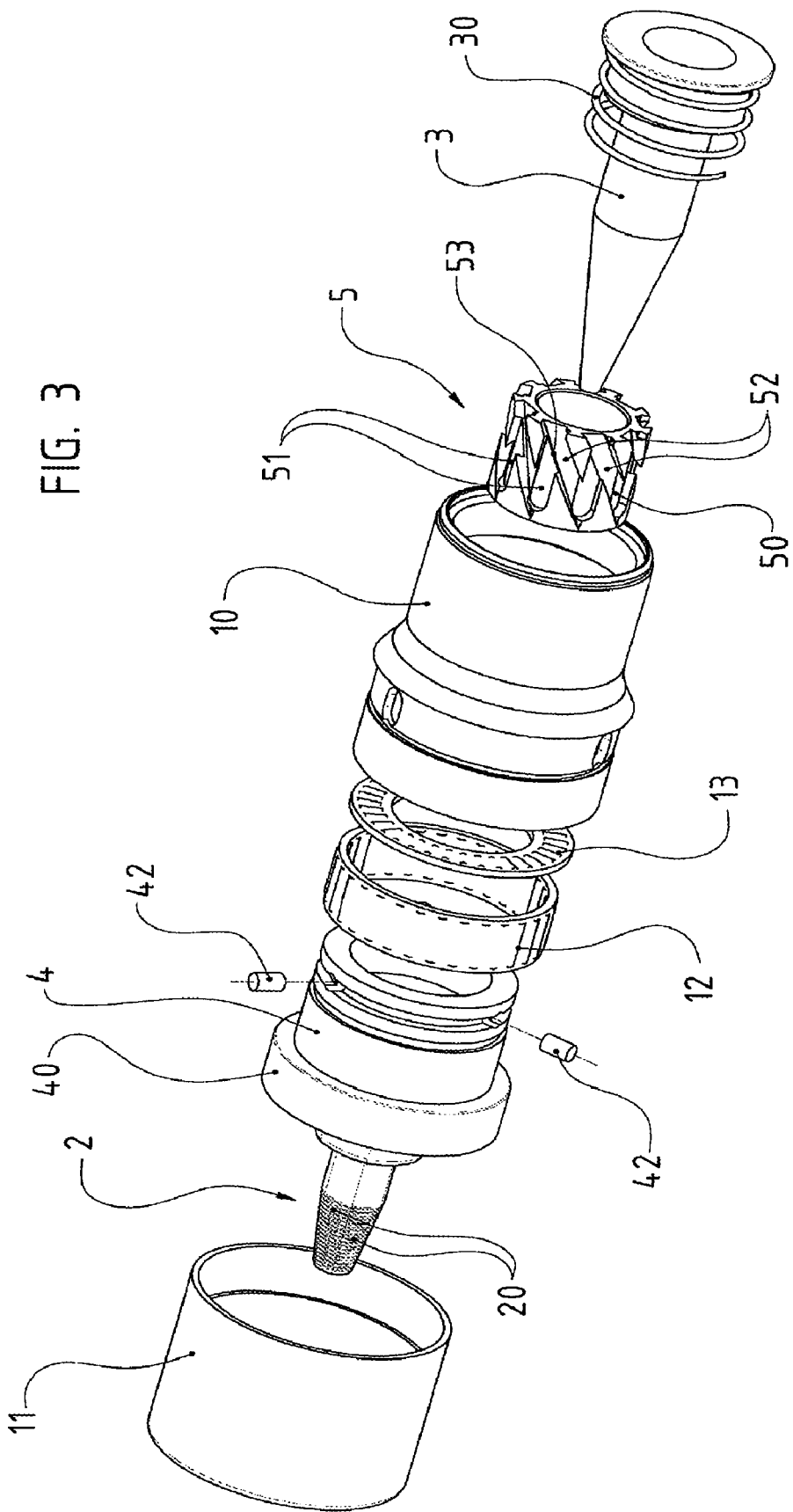
FIG. 3 shows a schematic prospective and exploded view of the same device.

When referring to FIGS. 1, 2 and 3, one can see that an expansion tool device for producing sockets at the ends of pipes or tubes made out of plastic or composite material according to the invention includes a body 1, in this case made of two parts, a fixed part 10 aimed at being fixed by screwing onto a tool, not shown, such as pliers or a machine for producing sockets, and a removable part 11, serving as a cap, assembled by screwing onto the fixed part 10.

The body 1 contains, in a known way, a ferrule 2 aimed at being inserted into the end of a tube to be widened, and formed by the tightening of several sector-shaped chucks 20. The body 1 also contains, in a traditional way, a tapered needle 3, axially movable under the actuation of the tool, so as to be capable of being inserted between the chucks 20 and of thus separating each of them in a radial direction, and being restored by a spring 30.

According to the invention, the tool device includes a crown 4, movable in axial swiveling inside the body 1 through bearings 12 and 13, and maintaining the chucks 20 while authorizing their radial displacement. Thus, the movable crown 4 comprises an annular portion 40 including an internal peripheral groove 41, while each of the chucks 20 has externally a flange portion 21 which, after the tightening of the chucks 20, forms a flange accommodated in the internal groove 41.

The chucks 20 are in addition connected in rotation to the movable crown 4, which is performed through radial guiding means. Thus, for example, each chuck 20 comprises, in its flange portion 21, a radial slit, while the annular portion 40 comprises pins that transversely pass through the internal groove 41 and are each inserted into a radial slit. Each chuck 20 can thus move radially with respect to the crown 4 while being guided by the slit and the pin.

Also according to the invention, onto the tapered needle 3 is inserted and made integral a cylindrical cam 5 that cooperates with catch followers 42 integral with the movable crown 4, only one of which can be seen in each FIGS. 1 and 2. The cylindrical cam 5 is peripherally provided with a cam path 50 defined, as can be seen in FIG. 3, by a series of alternating longitudinal grooves 51 and diagonal grooves 52, the longitudinal grooves 51 being of the same depth, whereas the diagonal grooves 52 are of a varying depth.

It should be noted that the diagonal grooves 52 can have other shapes, they can for example be helical, the most important being that the end of a longitudinal groove 51 is united to the opposite end of an adjacent longitudinal groove 51.

The connection between the longitudinal grooves 51 and the diagonal grooves 52 is performed as follows, on the side of the chucks 20 each diagonal groove 52 ends into a longitudinal groove 51 at one and the same level, while on the other side, the longitudinal groove 51 ends into the diagonal groove 52, which is deeper at that location, thus creating a diagonal shoulder 53.

Furthermore, the catch followers 42 are extensible under the action of a spring 43, so that they remain into contact with the cam path 50.

In operation, in stable position, i.e. when the tapered needle 3 is maintained separated from the chucks 20 under the action of the spring 30, as shown in FIG. 1, each catch follower 42 is inserted into a longitudinal groove 51, on the side of the chucks 20. When performing an expansion, i.e. when a thrust is exerted onto the tapered needle 3 in order to force the chucks 20 to separate, the cam 5 moves axially and, in a relative way, each of the catch followers 42 moves in a longitudinal groove 51. At the end of the longitudinal groove 51, the catch follower 42 passes beyond the shoulder 53 and falls into a diagonal groove 52. When the pressure on the tapered needle 3 is released for its return into a stable position, the spring 30 restores the tapered needle 3, which drives the cam 5 and, in a relative way, each of the catch followers 42 abuts against the shoulder 53 and inserts into a diagonal groove 52, thus causing the movable crown 4 and, hence, the chucks 20 connected to same to pivot.

After each expansion, the chucks 20 are automatically driven in swiveling. The user can thus perform a fast series of several expansions, without having to worry about the positioning of the chucks 20, since the latter will necessarily be in a different position, since the user did not change the position of the tool with respect to the tube.

The expansion tool according to the invention allows an important saving of time, while guaranteeing a very satisfactory result, since the rotation is automatic.

The angular displacement of the ferrule 2 is of course chosen as a function of the number of chucks 20, so that after a swiveling, and even several successive ones, the chucks 20 do not adopt a position previously adopted by another one. In the embodiment shown, the chucks 20 are six in number, and the architecture of the cam 5 allows at each operation a swiveling by ⅙ turn.

Figure 4A:
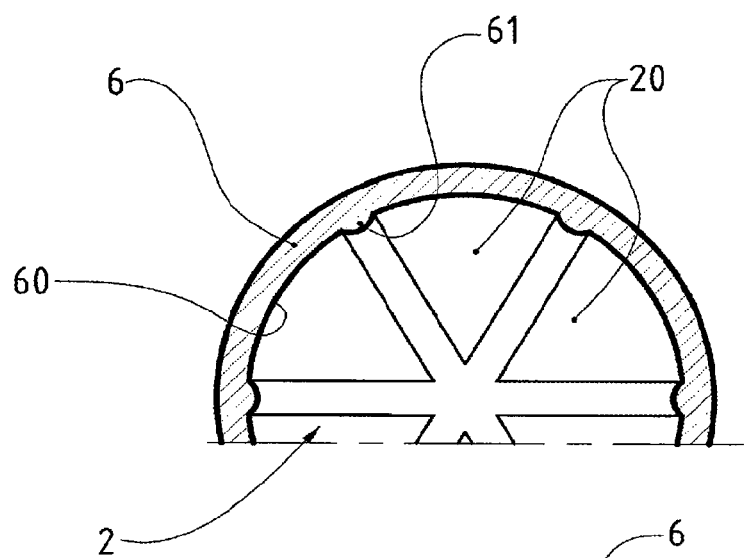
FIGS. 4a, 4b and 4c show schematic partial cross-sectional views of a tube during its widening with an expansion device according to the invention.
Figure 4B:
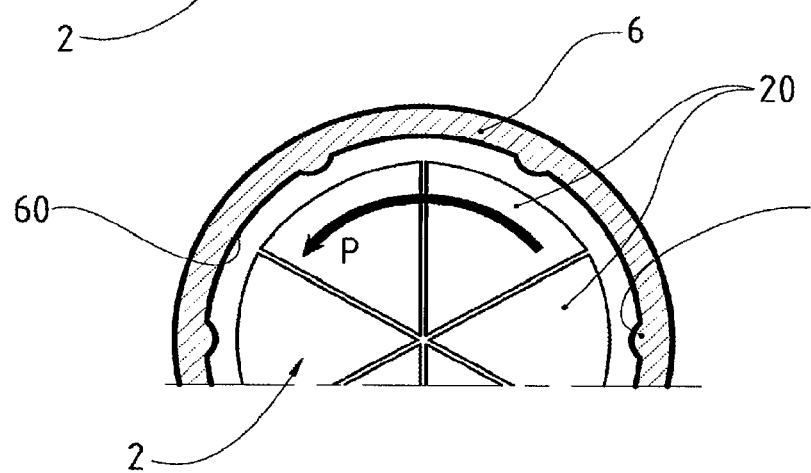
Figure 4C:
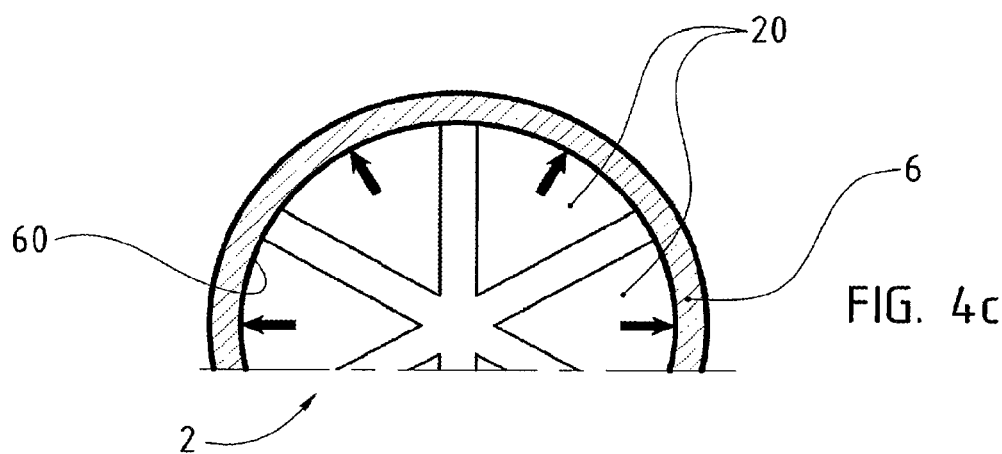

Other ratios are of course possible, thus, in FIGS. 4a, 4b and 4c can be seen successive operations of widening of a tube 6 by means of an expansion tool including a ferrule 2 with six chucks, and the cam of which, not shown, is designed capable of performing at each return a swiveling by 1/12 turn.

In FIG. 4a can be seen that during the first expansion of the chucks 20, turgidities 61 are created between each of them on the inner wall 60 of the tube 6.

When releasing the tool, in FIG. 4b, the chucks 20 return into the tightened initial position, which is accompanied by a swiveling P of a value of 1/12 turn, so that they are each in front of a turgidity 61, and that during the following expansion, in FIG. 4c, the chucks 20 flatten the turgidities 61.

In the embodiment shown, the cam 5 is carried by the tapered needle 3, while the catch followers 42 are integral with the ferrule 2. It should however be noted that the reverse can perfectly be contemplated, but it is more complex to be implemented, in particular with regard to the cam and the cam path of which must then be internal.

According to another embodiment, on the movable crown 4, the annular portion 40 and the ferrule 2 are replaced by means for fixing, for example screwing, an expansion tool of the traditional type. The body 1 then containing the remainder of the movable crown 4 and the cam 5 is in such case either permanently fitted on the pliers or the machine for producing sockets, or designed so as to constitute an interface element between a traditional expansion tool and pliers or a machine for producing the sockets.

What is claimed is:

1. An interface element comprising:
 a fixed part adapted to be fixedly mounted to a pliers or machine for actuating an expansion tool; and
 a tapered needle operatively engaged with the fixed part for cyclic axial movement relative to the fixed part in response to operation of the pliers or machine for actuating an expansion tool,
 wherein the tapered needle is constructed and arranged to connect to a plurality of chucks of an expansion tool for producing a socket at an end of a polymeric or composite material pipe such that: (i) a portion of each complete cycle of said cyclic axial movement of the tapered needle causes the plurality of chucks to move radially outwardly, (ii) a portion of each complete cycle of said cyclic movement permits the plurality of chucks to move radially inwardly, (iii) and each complete cycle of said cyclic movement results in the plurality of chucks rotating for a portion of a turn relative to the fixed part; and
 wherein the interface element further comprises a rotatable member operatively engaged with the fixed part for rotation relative to the fixed part, wherein the rotatable member is constructed and arranged to operatively engage a plurality of chucks of an expansion tool for producing a socket at an end of a polymeric or composite material pipe such that the plurality of chucks rotate with the rotatable member relative to the fixed part, and
 the rotatable member operatively engages the tapered needle such that:
  (i) each complete cycle of cyclic axial movement of the tapered needle results in the rotatable member rotating to an angular position that is different than an angular position of the rotatable member immediately prior to the complete cycle of said cyclic axial movement,
  (ii) the rotatable member rotates a portion of a turn while the needle is moving through a first portion of the cycle of said cyclic movement of the needle, and
  (iii) the rotatable member does not rotate while the needle is moving through a second portion of the cycle.

2. The interface element of claim 1, wherein the tapered needle is constructed and arranged to connect to a plurality of chucks of an expansion tool for producing a socket at an end of a polymeric or composite material pipe such that each complete cycle of said cyclic movement of the tapered needle causes each of the plurality of chucks to rotate to an angular position that was not occupied by any of the plurality of chucks immediately prior to the cycle of said cyclic movement.

3. The interface element of claim 1, wherein the tapered needle is constructed and arranged to connect to a plurality of chucks of an expansion tool for producing a socket at an end of a polymeric or composite material pipe such that a portion of each complete cycle of said cyclic movement of the tapered needle does not cause the plurality of chucks to rotate relative to the fixed part.

4. The interface element of claim 1, wherein:
 the cycle comprises an expansion stroke of the needle and a retraction stroke of the needle; and
 the first portion of the cycle comprises the retraction stroke, such that the rotatable member rotates during at least a part of the retraction stroke.

5. The interface element of claim 1, wherein:
 the cycle comprises an expansion stroke of the needle and a retraction stroke of the needle; and
 the second portion of the cycle comprises the expansion stroke, such that the rotatable member does not rotate during at least a part of the expansion stroke.

6. The interface element of claim 1, wherein:
the cycle comprises an expansion stroke of the needle and a retraction stroke of the needle; and
the rotatable member operatively engages the tapered needle such that the rotatable member does not rotate during at least a part of the needle's expansion stroke.

7. The interface element of claim 1, in combination with a plurality of chucks of an expansion tool for producing a socket at an end of a polymeric or composite material pipe,
wherein the plurality of chucks are constructed and arranged to operatively engage the fixed part so as to be movable in radial and rotational directions relative to the fixed part,
wherein the plurality of chucks are constructed and arranged to operatively engage the rotatable part so as to cause the plurality of chucks to rotate with the rotatable member relative to the fixed part, and
wherein the plurality of chucks are constructed and arrange to operatively engage the needle such that:
(i) a portion of the cycle of cyclic axial movement of the tapered needle causes the plurality of chucks to move radially outwardly, and
(ii) a portion of the cycle of cyclic axial movement of the tapered needle permits the plurality of chucks to move radially inwardly.

8. The interface element of claim 7, wherein the rotatable member comprises a surface feature that is constructed and arranged to engage a complimentary surface feature of the plurality of chucks so as to cause the plurality of chucks to rotate with the rotatable member relative to the fixed part.

9. The interface element of claim 8, wherein the rotatable member is rotatable relative to the needle.

10. The interface element of claim 7, wherein the plurality of chucks operatively engage the fixed part, the needle, and the rotatable member.

11. An expansion tool apparatus for producing a socket at an end of a pipe, the pipe being of a polymeric or composite material, the expansion tool apparatus comprising:
a fixed part adapted to be fixedly mounted to a pliers or machine for actuating an expansion tool;
a plurality of chucks operatively engaged with the fixed part and movable in radial and rotational directions relative to the fixed part;
a tapered needle operatively engaged with the fixed part for cyclical axial movement relative to the fixed part in response to operation of the pliers or machine for actuating an expansion tool, wherein:
(i) a portion of each cycle of said cyclical axial movement of the tapered needle causes the plurality of chucks to move radially outwardly,
(ii) a portion of each cycle of said cyclical axial movement permits the plurality of chucks to move radially inwardly; and
a rotatable member operatively engaging the fixed part for rotation relative to the fixed part, the rotatable member operatively engaging the plurality of chucks such that the plurality of chucks rotate with the rotatable member relative to the fixed part,
wherein the rotatable member operatively engages the tapered needle such that:
(i) each cycle of said cyclical axial movement of the tapered needle results in the rotatable member rotating to an angular position that is different than an angular position of the rotatable member immediately prior to the cycle of said cyclical axial movement of the tapered needle,
(ii) the rotatable member rotates a portion of a turn while the needle is moving through a first portion of the cycle of the needle from, and
(iii) the rotatable member does not rotate while the needle is moving through a second portion of the cycle.

12. The expansion tool apparatus of claim 11, wherein movement of the tapered needle through the cycle causes each of the plurality of chucks to rotate to an angular position that was not occupied by any of the plurality of chucks immediately prior to that cycle of movement of the needle.

13. The expansion tool apparatus of claim 11, wherein the rotatable member comprises a surface feature that engages a complimentary surface feature of the plurality of chucks so as to cause the plurality of chucks to rotate with the rotatable member relative to the fixed part.

14. The expansion tool apparatus of claim 11, wherein the rotatable part is rotatable relative to the needle.

15. The expansion tool apparatus of claim 11, wherein:
each complete cycle of cyclic axial movement of the tapered needle causes the plurality of chucks to rotate by a turn angle,
each of the plurality of chucks are sector-shaped, and
the turn angle is different from an angle defined by the sector-shape.

16. The expansion tool apparatus of claim 11, wherein:
each complete cycle of cyclic axial movement of the tapered needle causes the plurality of chucks to rotate by a turn angle, a ratio of a whole turn to the turn angle is different than a sum of the plurality of chucks.

* * * * *